United States Patent
Colson et al.

(10) Patent No.: US 10,662,276 B2
(45) Date of Patent: May 26, 2020

(54) HIGH MOLECULAR WEIGHT HYDROPHOBIC POLYOL

(71) Applicant: Dow Global Technologies LLC, Midland, MI (US)

(72) Inventors: Adam C. Colson, Boise, ID (US); Dan Yu, Richmond, TX (US); Daniel A. Aguilar, Lake Jackson, TX (US); Amber Marie Stephenson, Lake Jackson, TX (US); William H. Heath, Lake Jackson, TX (US); Shouren Ge, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 41 days.

(21) Appl. No.: 15/774,827

(22) PCT Filed: Nov. 9, 2016

(86) PCT No.: PCT/US2016/061128
§ 371 (c)(1),
(2) Date: May 9, 2018

(87) PCT Pub. No.: WO2017/083380
PCT Pub. Date: May 18, 2017

(65) Prior Publication Data
US 2018/0346637 A1  Dec. 6, 2018

Related U.S. Application Data

(60) Provisional application No. 62/254,217, filed on Nov. 12, 2015.

(51) Int. Cl.
*C08G 18/48* (2006.01)
*C08G 18/10* (2006.01)
(Continued)

(52) U.S. Cl.
CPC ......... *C08G 18/4854* (2013.01); *C08G 18/10* (2013.01); *C08G 18/3206* (2013.01);
(Continued)

(58) Field of Classification Search
CPC ...................................................... C08G 16/48
(Continued)

(56) References Cited

U.S. PATENT DOCUMENTS 4,687,788 A  8/1987  Hillshafer et al.
4,745,170 A  5/1988  Bushman et al.
(Continued)

FOREIGN PATENT DOCUMENTS

WO  2015050811  4/2015

*Primary Examiner* — Duc Truong (57) ABSTRACT

A cured composition including a reaction product of a mixture that includes an isocyanate component having one or more isocyanates and an isocyanate-reactive component having a butylene oxide based polyol, which has a number average molecular weight greater than 2,000 g/mol and less than 8,000 g/mol and a nominal hydroxyl functionality from (2) to (4). At least (50) wt % of a total weight of alkylene oxides used to form the butylene oxide based polyol is butylene oxide. An isocyanate index of the mixture is from (90) to (150). The cured composition in a cured state exhibits a first tan delta peak between a first temperature range of 50° C. to 0° C. and a second tan delta peak between a second temperature range of 75° C. and 150° C., according to a tan delta plot over a range of temperatures, and a value of the first tan delta peak and a value of the second tan delta peak each represents a ratio of a loss modulus of the cured composition and a storage modulus of the cured composition at a specific temperature within the range of temperatures, as measured according to dynamic mechanical thermal analysis. The values of the first and the second tan delta peaks are from (0.10) to (0.90).

10 Claims, 4 Drawing Sheets

(51) Int. Cl.
*C09D 175/08* (2006.01)
*C09J 175/08* (2006.01)
*C08G 18/76* (2006.01)
*C08G 18/32* (2006.01)

(52) U.S. Cl.
CPC ..... *C08G 18/4812* (2013.01); *C08G 18/7614* (2013.01); *C08G 18/7671* (2013.01); *C09D 175/08* (2013.01); *C09J 175/08* (2013.01)

(58) Field of Classification Search
USPC .......................................................... 528/77
See application file for complete search history.

(56) References Cited

U.S. PATENT DOCUMENTS

| | | |
|---|---|---|
| 5,162,387 A | 11/1992 | Abel et al. |
| 5,317,076 A | 5/1994 | Primeaux, II |
| 6,613,864 B1 | 9/2003 | Porter et al. |
| 7,393,465 B2 | 7/2008 | Niesten et al. |
| 2012/0295104 A1 | 11/2012 | Barker |
| 2015/0105485 A1 | 4/2015 | Miyata |

HIGH MOLECULAR WEIGHT HYDROPHOBIC POLYOL

FIELD

Embodiments relate to high molecular weight hydrophobic polyols for polyurethane based applications, polyurethane based applications (such as adhesives and coatings) that incorporate such hydrophobic polyols, methods of making such polyurethane based applications, and methods of using such polyurethane based applications.

INTRODUCTION

Thermosetting polyurethane polymers are commonly employed in a variety of industrial applications due to the broad range of physical and mechanical properties that can be achieved through judicious selection of formulation components. However, the long-term performance and durability of polyurethane materials may be adversely affected by exposure to high ambient humidity and/or by direct and prolonged contact with bulk water. In particular, it is believed that water has the potential to participate in chemical reactions that can degrade the polymer backbone in the polyurethane materials and/or may have a plasticizing effect on the polymer network (e.g., resulting in a reduction in properties such as tensile strength and/or modulus). Therefore, alternatives for forming polyurethane based applications such as adhesives and coatings are sought in which the resultant materials provide for increased performance even after exposure to high ambient humidity and/or by direct and prolonged contact with bulk water.

SUMMARY

Embodiments may be realized by providing a cured composition including a reaction product of a mixture that includes an isocyanate component having one or more isocyanates and an isocyanate-reactive component having a butylene oxide based polyol, which has a number average molecular weight greater than 2,000 g/mol and less than 8,000 g/mol and a nominal hydroxyl functionality from 2 to 4. At least 50 wt % of a total weight of alkylene oxides used to form the butylene oxide based polyol is butylene oxide. An isocyanate index of the mixture is from 90 to 150. The cured composition in a cured state exhibits a first tan delta peak between a first temperature range of −50° C. to 0° C. and a second tan delta peak between a second temperature range of 75° C. and 150° C., according to a tan delta plot over a range of temperatures, and a value of the first tan delta peak and a value of the second tan delta peak each represents a ratio of a loss modulus of the cured composition and a storage modulus of the cured composition at a specific temperature within the range of temperatures, as measured according to dynamic mechanical thermal analysis. The values of the first and the second tan delta peaks are from 0.10 to 0.90. Embodiments may also be realized by providing a polyurethane based adhesive that includes the cured composition. Embodiments may be further realized by providing a polyurethane based coating that includes the cured composition.

DETAILED DESCRIPTION

A cured composition for polyurethane based applications may be prepared as an one-component system or a two-component system. Whereas, the one-component system may be a preformed (pre-reacted) curable polyurethane based composition that is applied as a single component to a substrate and allowed to cure to form an adhesive layer or a coating on the substrate. The two-component system may be a composition in which separate components are combined immediately before, during, or after application to a substrate and the resultant reaction mixture is allowed to cure to form a polyurethane based adhesive layer or coating on the substrate. Polyurethane based applications encompass adhesives, coatings, sealants, elastomers, and like applications as would be understood by a person of ordinary skill in the art. The cured compositions, according to exemplary embodiments, are well-formulated for use in adhesives and coatings.

Embodiments relate to cured compositions, such as adhesive formulations, employing a high molecular weight butylene oxide (BO) based polyol (such as a triol). The cured composition exhibits two glass transition temperature peaks, as discussed below, which presents a unique two-phase morphology across a wide temperature range. The two-phase morphology includes a soft phase rich in hydrophobic triol reinforced by micron-sized hard domains. Further, the relatively high molecular weight of the butylene oxide based polyol permits the preparation of two-component formulations with a nominal volumetric mix ratio near 1:1, which may be an ideal mix ratio for adhesive applications. Also, adhesives prepared using butylene oxide based polyols (such as triols) may perform as well as a PO/EO-based analogue on steel and aluminum, while also providing the additional advantage of improved hydrophobicity.

The cured composition includes the cured reaction product of at least an isocyanate component and an isocyanate-reactive component. In embodiments, the isocyanate component includes one or more isocyanates, which may be in the form of polyisocyanates and/or isocyanate-terminated prepolymers. The isocyanate-reactive component includes at least a high molecular weight (i.e., a number average molecular weight greater than 2,000 g/mol) butylene oxide based polyol. For example, the number average molecular weight of the butylene oxide based polyol may be from 2500 g/mol to 8000 g/mol, 3000 g/mol to 7000 g/mol, 3500 g/mol to 6000 g/mol, 4000 g/mol to 5500 g/mol, 4500 g/mol to 5500 g/mol, 4500 g/mol to 5000 g/mol, 4500 g/mol to 4900 g/mol, etc.). The high molecular weight butylene oxide based polyol has a nominal hydroxyl functionality that is from 2 to 4 (e.g., is a triol).

By butylene oxide based polyol it is meant that at least 50 wt % (i.e., a majority) of the total weight of alkylene oxides used to form the polyol is butylene oxide. For example, the butylene oxide based polyol may have a butylene oxide derived content of at least 50 wt % (at least 60 wt %, at least 70 wt %, at least 80 wt %, and/or at least 90 wt %), and a remainder of the alkylene oxide content (if present) may be propylene oxide and/or ethylene oxide. The butylene oxide based polyol may have at least 50 wt % (e.g., from 60 wt % to 95 wt %) of units derived from butylene oxide, based on the total weight of the butylene oxide based polyol.

The cured composition, in a cured state, exhibits distinct glass transition temperatures (Tg) in a temperature range from −50° C. to 0° C. and in a separate temperature range from 75° C. to 150° C. Whereas, Tg is the reversible change of amorphous material or amorphous regions of a partially crystalline material of the cured composition from (or to) a viscous or rubbery condition to (from) a hard and relatively brittle condition. In viscoelastic materials such adhesives and coatings, a maximum dissipation of energy occurs as heat at the Tg. Accordingly, in the cured composition, the dissipation of energy is separated out over a range of temperatures so that distinct transitions between glass and rubber phases are realized in the range of −50° C. to 0° C. and also in the range of 75° C. to 150° C. According to exemplary embodiments, distinct transitions between the glass and rubber phases may be realized in the ranges of the following: −50° C. to −5° C. and 80° C. to 140° C., −45° C. to −15° C. and 85° C. to 125° C., and/or −40° C. to −20° C. and 90° C. to 110° C. Dynamic mechanical thermal analysis (DMTA) may be used for measuring the glass transition temperatures, using a fixed oscillatory frequency (1 Hz) and a steady temperature ramp of 3° C./min (e.g., using a TA Instruments ARES II rheometer in the torsion mode, or like instrument as would be understood by a person of ordinary skill in the art).

Without intending to be bound by this theory, the presence of distinct glass transition temperatures may ensure that, at any temperature between these two glass transition temperatures, a rubbery phase that has already transitioned from a brittle glassy phase into a rubber state and a brittle glassy phase that is yet to transition into a rubbery state co-exist. This allows for a more uniform mechanical behavior as a function of temperature between the two glass transition temperatures of the respective phases. For example, the presence of rubbery phase allows for material that is deformable and the presence of a rigid glassy phase provides a reinforcing mechanism that increases the hardness, tensile strength, and mechanical integrity of the material. The ability to conform to a specific shape, e.g., for the ability to be a well-functioning adhesive, may be realized. In contrast, materials that exhibit only one glass transition temperature are essentially a glass below the glass transition temperature and, hence, brittle and unable to provide adequate adhesion over a range of temperatures. Such a single glass transition material is also essentially a rubber above the glass transition temperature, where the material does not have sufficient mechanical strength to provide mechanical integrity to adhesives and/or coatings.

The effectiveness of the viscoelastic materials in energy dissipation may be evaluated by measuring the materials' viscoelastic response to a stress-strain cycle in the form of dynamic mechanical tests, and the results are given in terms of storage modulus and loss modulus. According to an embodiment, DMTA may be used for determining the glass transition temperature and/or viscoelastic properties of the cured composition. In particular, DMTA is used to measure shear storage modulus (G'), loss modulus (G''), and glass transition temperature, as a function of temperature. A tan delta (tan δ) plot is also generated, resulting from the loss modulus divided by the storage modulus (G''/G') as a function of temperature (i.e., tan δ is a measure of the ratio of energy dissipated as heat to maximum energy stored in the material). Accordingly, tan δ increases to a peak (i.e., an uppermost point along a rising peak of a tan δ plot) at a temperature in which the energy dissipated as heat approaches the energy stored (viz., at a time when the glass-rubber phase transition temperature is reached). In a material having the phase-separated morphology (i.e., a combined glass-rubber phase), DMTA realizes at least two distinct tan δ peaks. Accordingly, the dissipation of heat is spread out over the range of temperatures between the at least two distinct tan δ peaks, instead of being mainly concentrated around one tan δ peak.

Isocyanate Component

The isocyanate component includes at least one isocyanate, such as at least one polyisocyanate and/or at least one isocyanate terminated prepolymer derived from at least one polyisocyanate. In exemplary embodiments, the isocyanate component may include additional additives.

Exemplary polyisocyanates include aromatic, cycloaliphatic, and aliphatic polyisocyanates. For example, polyisocyanates known in the art may be used. Examples of polyisocyanates include the 4,4'-, 2,4' and 2,2'-isomers of diphenylmethane diisocyante (MDI), modifications, and blends thereof (e.g., polymeric or monomeric MDI blends), 2,4- and 2,6-isomers of toluene-diisocyante (TDI), modifications, and blends thereof, m- and p-phenylenediisocyanate, chlorophenylene-2,4-diisocyanate, diphenylene-4,4'-diisocyanate, 4,4'-diisocyanate-3,3'-dimethyldiphenyl, 3-methyldiphenyl-methane-4,4'-diisocyanate, diphenyletherdiisocyanate, 2,4,6-triisocyanatotoluene, 2,4,4'-triisocyanatodi phenylether, ethylene diisocyanate, and 1,6-hexamethylene diisocyanate. Derivatives of any of the foregoing polyisocyanate groups that contain, e.g., biuret, urea, carbodiimide, allophonate, and/or isocyanurate groups, may be used.

If included, the isocyanate-terminated prepolymer may have a free isocyanate group (NCO) content of 1 wt % to 35 wt % (e.g., 5 wt % to 30 wt %, 10 wt % to 30 wt %, 15 wt % to 25 wt %, 15 wt % to 20 wt %, etc.), based on the total weight of the prepolymer. If present, one or more isocyanate terminated prepolymers may account for 20 wt % to 100 wt % (e.g., from 20 wt % to 80 wt %, from 30 wt % to 70 wt %, from 40 wt % to 60 wt %, from 45 wt % to 55 wt %, etc.) of the isocyanate component, and a remainder (if present) of the isocyanate component may be one or more polyisocyanates and/or at least one additives. If present, one or more isocyanate-terminated prepolymers may account for 5 wt % to 70 wt % (e.g., from 20 wt % to 65 wt % and/or from 35 wt % to 60 wt %) of the total weight of the reaction mixture for forming the cured composition The isocyanate-terminated prepolymer may be formed by the reaction of another isocyanate component with another isocyanate-reactive component (both different and separate from the isocyanate-component and isocyanate-reactive component for forming the cured composition), in which the isocyanate component is present in stoichiometric excess. For example, when a polyol contains an active hydroxyl group, the reaction of the active hydroxyl group with an isocyanate moiety results in the formation of a urethane linkage, as such the prepolymer may include both a urethane linkage and an isocyanate terminal group. For example, the prepolymer may be prepared in an one-pot procedure using at least one polyether polyol. As an example, the polyether polyol(s) used in preparing the prepolymer is derived from propylene oxide, ethylene oxide, and/or butylene oxide. In an example, the polyether polyol(s) used for forming the isocyanate-terminated prepolymer may be prepared using only butylene oxide and/or propylene oxide (such as derived from a majority of butylene oxide based on the total amount of alkylene oxides used to form the polyol, similar to the butylene oxide based polyol described above). For example, the polyether polyol may be a low molecular weight butylene oxide polyol, e.g., having number average molecular weight from 1500 g/mol to 3500 g/mol, 1500 g/mol to 3000 g/mol, 1500 g/mol to 2500 g/mol, etc. The number average molecular weight of the butylene oxide based polyether polyol used for the prepolymer may be less than the number average molecular of the butylene oxide based polyol included in the isocyanate-reactive component for forming the cured composition.

An isocyanate index for forming the cured composition is from 90 to 150 (e.g., 90 to 130). By isocyanate index, it is meant a ratio of equivalents of isocyanate groups in the reaction mixture for forming the cured composition to the active hydrogen atoms in the reaction mixture for forming the cured composition, for forming the polyurethane polymers, multiplied by 100. Said in another way, the isocyanate index is the molar equivalent of isocyanate (NCO) groups divided by the total molar equivalent of isocyanate-reactive hydrogen atoms present in a formulation, multiplied by 100. As would be understood by a person of ordinary skill in the art, the isocyanate groups in the reaction mixture for forming the cured composition may be provided through the isocyanate component, and the active hydrogen atoms may be provided through the isocyanate reactive component. The isocyanate index for forming the isocyanate-terminated prepolymer may be greater than 200.

A volumetric ratio of the isocyanate component to the isocyanate-reactive component for forming the cured composition is from 0.7:1.3 to 1.3:0.7, 0.8:1.2 to 1.2:0.8. 0.9:1.1 to 1.1:0.9. By volumetric ratio it is meant the ratio of the total volume of the isocyanate component to the total volume of the isocyanate-reactive component.

Isocyanate-Reactive Component

The isocyanate-reactive component includes at least one high molecular weight butylene oxide based polyol (i.e., a polyol having molecular weight greater than 2000 g/mol). In exemplary embodiments, the high molecular butylene oxide based polyol is present in an amount from 5 wt % to 100 wt % (e.g., 10 wt % to 100 wt %, 20 wt % to 100 wt %, 30 wt % to 100 wt %, 40 wt % to 100 wt %, 50 wt % to 100 wt %, 60 wt % to 100 wt %, 60 wt % to 90 wt %, 60 wt % to 80 wt %, 65 wt % to 100 wt %, 65 wt % to 90 wt %, 65 wt % to 85 wt %, 65 wt % to 75 wt %, etc.), based on the total weight of the polyols (including non-butylene oxide based polyols) in the isocyanate-reactive component. In exemplary embodiments, the high molecular weight butylene oxide based polyol is present in an amount from 5 wt % to 50 wt % (e.g., 5 wt % to 45 wt %, 10 wt % to 40 wt %, 10 wt % to 30 wt %, 15 wt % to 30 wt %, 15 wt % to 25 wt %, etc.) based on the total weight of a reaction mixture for forming the cured composition. The isocyanate-reactive component may optionally include other butylene oxide based polyols, e.g., have a relatively lower molecular weight and a nominal hydroxyl functionality from 2 to 6.

In exemplary embodiments, the butylene oxide based polyol may be a polyoxybutylene-polyoxypropylene polyol that includes at least 50 wt %, at least 60 wt %, at least 70 wt %, at least 80 wt %, and/or at least 90 wt % of butylene oxide, and a remainder of at least 5 wt % of propylene oxide and/or ethylene oxide, based on the total alkylene oxide content of the butylene oxide based polyol. In other exemplary embodiments, the butylene oxide based polyol may be an all butylene oxide polyol, i.e., 100 wt % of the alkylene oxide content is butylene oxide. For example, the high molecular weight butylene oxide based polyol may be derived from 75 wt % to 100 wt %, 85 wt % to 100 wt %, 90 wt % to 100 wt %, and/or 95 wt % to 100 wt % of butylene oxide, based on the total weight of alkylene oxides in the polyol (i.e., includes from 75 wt % to 100 wt %, 85 wt % to 100 wt %, 90 wt % to 100 wt %, and/or 95 wt % to 100 wt % of butylene oxide content). A remainder of the alkylene oxide content may be accounted for with propylene oxide and/or ethylene oxide.

For example, the high molecular weight butylene oxide based polyol may be derived form 75 wt % to 100 wt % of butylene oxide, based on a total weight of alkylene oxides, and has a nominal hydroxyl functionality of 3. For example, the high molecular weight butylene oxide based polyol may be a polyoxybutylene polyol, a polyoxybutylene-polyoxypropylene polyol, or a polyoxybutylene-polyoxyethylene having a nominal hydroxyl functionality of 3. In exemplary embodiments, the butylene oxide content based on the total weight of the high molecular weight butylene oxide based polyol, may be from 75 wt % to 100 wt % and/or from 80 wt % to 100 wt %. As would be understood by a person of ordinary skill in the art, the remainder of to the total weight of the first butylene oxide based polyol is derived from the initiator (e.g., any initiator commonly known for preparing a polyol having a nominal hydroxyl functionality of 3) and optionally propylene oxide and/or ethylene oxide.

If the high molecular weight butylene oxide based polyol is an all BO polyol (i.e., all butylene oxide polyol), propylene oxide and ethylene oxide are not used in forming the polyol. The butylene oxide based polyol may be a mixed feed polyol or a copolymer block polyol. If the polyol is a copolymer polyol, such as a BO/PO copolymer polyol (i.e., butylene oxide/propylene oxide copolymer polyol), the polymerization reaction includes adding at least two different alkylene oxides (e.g., BO and PO) to the initiator having from 2 to 8 active hydrogen atoms. The copolymer polyol may be a mixed oxide copolymer or a block copolymer. For example, the BO/PO copolymer polyol may have an internal block of PO with an external BO block. A catalyst for the polymerization reaction for forming the polyol may be anionic or cationic. Exemplary catalysts include, e.g., potassium hydroxide (KOH), CsOH, boron trifluoride, and double-metal cyanide complex (DMC) catalysts such as a zinc hexacyanocobaltate or a quaternary phosphazenium compound.

The high molecular weight butylene oxide based polyols may be prepared by a polymerization reaction that includes adding at least one stage of adding butylene oxide in the presence of initiator having from 2 to 8 (e.g., 2 to 6, 2 to 4, etc.) active hydrogen atoms and/or in the presence of a lower molecular weight polyol. For example, the high molecular weight butylene oxide based polyol may be prepared using from one to ten (e.g., 1 to 5, 2 to 5, etc.) separate stages of subsequent addition of butylene oxide to the initiator and/or relatively lower molecular weight polyol. The lower molecular weight polyol may include an intermediate butylene oxide based polyol and/or another polyether polyol, such as a pre-formed propylene oxide based polyol and/or an ethylene oxide based polyol. If the butylene oxide based polyol is prepared using the KOH based catalyst, the polyol may be neutralized thereafter, e.g., using magsil, as would be understood by a person of ordinary skill in the art. Exemplary initiators for forming the high molecular weight butylene oxide based polyols include, e.g., glycerin, ethylene glycol, diethylene glycol, propylene glycol, dipropylene glycol, trimethylolpropane glycerol, butanediol, hexanediol, sorbitol, sucrose, as would be understood by a person of ordinary skill in the art.

In exemplary embodiments, the initiator (which may be a polyol) is only added at the first stage, and during the subsequent stages, the lower molecular intermediates are reacted with additional butylene oxide (optional propylene oxide and/or ethylene oxide). For example, at the first stage, a resultant product of reacting the initiator (such as one having a 3 active hydrogen atoms) with a first feed of butylene oxide results in a first intermediate having a number average molecular weight from 500 g/mol to 1500 g/mol. At a second stage, the un-neutralized first intermediate is reacted with additional butylene oxide resulting in a second intermediate having a number average molecular weight from 3000 g/mol to 4000 g/mol. At a third stage, the un-neutralized second intermediate is reacted with additional butylene oxide resulting in a third intermediate having a number average molecular weight from 4200 g/mol to 5200 g/mol. Subsequent stages may be added. In exemplary embodiments, the second stage may be excluded. In other exemplary embodiments, the first and second stages may be avoided, and the third stage may be performed using a pre-formed polyether polyol having a molecular weight from 500 g/mol to 3000 g/mol. Further, various stages may include the addition of propylene oxide and/or ethylene oxide (e.g., in addition to butylene oxide or as mixed feed with butylene oxide).

A remainder, if present, of the total weight of polyols in the isocyanate-reactive component (e.g., and the free polyols present in the reaction mixture for forming the cured composition) may include at least one polyether polyol and/or polyester polyol. The polyether polyol and/or polyester polyol may not be derived from butylene oxide. For example, the isocyanate-reactive component may include an additional polyether polyol that is a propylene oxide and/or ethylene oxide based polyether polyol. The additional polyether polyol may have a nominal hydroxyl functionality from 2 to 6 and a number average molecular weight from 50 g/mol to 10,000 g/mol.

For example, the isocyanate-reactive component includes from 2 wt % to 50 wt % (e.g., 5 wt % to 40 wt %, etc.) of a low molecular weight (e.g., from 50 g/mol to 400 g/mol) and low nominal functionality (e.g., from 2 to 3) polyoxypropylene polyol and/or polyoxypropylene-polyoxyethylene polyol. In exemplary embodiments, the isocyanate-reactive component may include dipropylene glycol, which exists as a blend of isomers, including isomers having secondary hydroxyl groups. The dipropylene glycol may act as a chain extender that assists in the formation of hard segments capable of separating from the soft segment. A chain extender, such as dipropylene glycol, may be present in an amount from the chain extender component may be account for 2 wt % to 25 wt % (e.g., 2 wt % to 20 wt %, etc.), of the total weight of the isocyanate-reactive component. Exemplary chain extenders may be polyols, such as a low number average molecular weight (e.g., less than 500 g/mol) and low hydroxyl functionality (e.g., 2 or 3) polyol. Exemplary chain extenders include 1,4-butanediol, 2-ethylhexanediol, propylene glycol, ethylene glycol, and diethylene glycol.

The isocyanate-reactive component may include a primary hydroxyl containing alcohol, such as a polybutadiene, a polytetramethylene ether glycol (PTMEG), a polypropylene glycol (PPG), a polyoxypropylene, and/or a polyoxyethylene-polyoxypropylene.

Additives

Various additives may be added to the reaction mixture for forming the cured composition to adjust characteristics of the resultant adhesive or coating, e.g., additives known to those of ordinary skill in the art may be used. Additives may be added as part of the isocyanate component and/or the isocyanate-reactive component. Exemplary additives include a catalyst, an adhesion promoter, a moisture scavenger, a curative, a pH neutralizer, a plasticizer, a compatibilizer, a filler (such as functional fillers, silica based fillers, and mineral based fillers), pigments/dyes, and/or a cross-linker.

A catalyst component may be added that includes at least one catalyst, e.g., may be added to the isocyanate-reactive component. For example, the catalyst component may have tin and/or amine based catalysts, e.g., that accounts for less than 5 wt % of a total weight of the isocyanate-reactive component. For example, a commercially available catalyst may be used. The catalysts may be used in small amounts, such as from 0.0015 wt % to 5 wt % (e.g., 0.01 wt % to 1.0 wt %, etc.). Examples of catalysts include tertiary amines, tin carboxylates, organotin compounds, tertiary phosphines, various metal chelates, and/or metal salts of strong acids (such as ferric chloride, stannic chloride, stannous chloride, antimony trichloride, bismuth nitrate, and bismuth chloride).

An adhesion promoter component may be added that includes at least one adhesion promoter, e.g., may be added to the isocyanate-reactive component. For example, the adhesion promoter component may include at least one silane based adhesion promoter. If included, the optional adhesion promoter may account for less than 5 wt % of a total weight of the isocyanate-reactive component.

A moisture scavenger component may be added that includes at least one moisture scavenger, e.g., may be added to the isocyanate-reactive component. If included, the moisture scavenger component may account for 1 wt % to 20 wt % (e.g., 1 wt % to 15 wt %, 1 wt % to 10 wt %, 1 wt % to 5 wt %, 2 wt % to 5 wt %, etc.) of the total weight of the isocyanate-reactive component. Exemplary moisture scavengers include zeolites or molecular sieves, reactive silanes (such as vinyltrialkoxysilanes), and minerals (such as calcium oxide).

Fillers may be present to provide desired rheological properties, mechanical reinforcement, chemical resistance, and/or reduce cost. The fillers may be added to the isocyanate-reactive component and/or the isocyanate component. Examples of fillers include inorganic particulate materials such as talc, titanium dioxide, calcium carbonate, calcium oxide, silica, mica, wollastonite, fly ash, metal particles, carbon black, graphite, high melting organic polymers, and/or reinforcements. Fillers also include reinforcements type fillers, e.g., flake or milled glass and/or fumed silica, which may be used to impart certain properties. Fillers may constitute up to 90% by weight of the mixture for forming the cured composition.

A plasticizer may be present. If present, the plasticizer may be mixed with the isocyanate-reactive component, e.g., to reduce its viscosity to facilitate mixing with the isocyanate component, which may have a lower viscosity. The plasticizer may enable higher filler loading, reduce cost, and/or reduce modulus. Examples of suitable plasticizers include liquid (at 25° C.) esters of monocarboxylic acids and diesters of dicarboxylic acids having molecular weights of up to about 300.

Pigment and/or dyes may be present, e.g., titanium dioxide and/or carbon black, may be used to impart color properties. Other additives include, e.g., UV stabilizers, antioxidants, and air release agents, which may be independently used depending on the desired characteristics.

Cured Composition

A cured composition that includes the high molecular weight butylene oxide based polyol (such as a triol) can be used to produce adhesive materials exhibiting two glass transition temperatures (Tg's) and elastomeric mechanical properties. Further, the use of the high molecular weight butylene oxide based polyol enables the formulation of two-component adhesive systems with a nominal volumetric mix ratio from 0.8:1.2 to 1.2:0.8. The resultant cured compositions prepared may also exhibit higher resistance to water uptake than polymers prepared with non-butylene oxide based (or similar hydrophobic polyol based) compositions of comparable molecular weight and functionality. Also, the use of the butylene oxide based polyol in adhesive and/or coating formulations does not adversely impact resultant properties when compared to analogous formulations prepared with polyols produced from propylene oxide and/or ethylene oxide.

Mixing and application of a reaction mixture for forming the cured composition may be done in any convenient manner. In the case in which the ingredients are formulated into two components (e.g., separate isocyanate-component and isocyanate-reactive component), the components may be combined at ambient temperature or any desirable elevated temperature, deposited onto the substrate and/or between substrates and allowed to react and then cure. The mixing of the components may be done in any convenient way, depending on the particular application and available equipment. Mixing of the components may be done batchwise, mixing by hand, or by using various kinds of batch mixing devices, followed by application by spraying, brushing, pouring, applying a bead, and/or in other suitable manner. The two components may be packaged into separate cartridges and simultaneously dispensed through a static mixing device to mix and apply them, typically as a bead, onto the surface. In exemplary embodiments, a one-shot synthesis system may be useful for preparing the cured composition.

Formulations for adhesives and coatings are selected based on the physical properties of the adherends/substrates. Exemplary adherends/substrates include metals, plastics, woods, natural stone and minerals, paper products, and textiles. It is desirable that the components used in the cured composition provide a wide range of mechanical and thermal properties. The components may also provide for low viscosities. For example, a polyurethane-based adhesive may include and/or consist essentially of the cured composition according to embodiments discussed herewithin. A polyurethane based coating may include and/or consist essentially of the cured composition according to embodiments discussed herewithin.

All parts and percentages are by weight, unless indicated otherwise. All values for molecular weight are based on number average molecular weight, unless indicated otherwise. The following examples are provided to illustrate the invention, but are not intended to limit the scope thereof.

EXAMPLES

Approximate properties, characters, parameters, measurements, etc., are provided below with respect to various working examples, comparative examples, and the materials used in the working and comparative examples.

Preparation of High Molecular Weight BO Polyol

The High MW BO Polyol is prepared in a reactor, in which the targeted butylene oxide is feed to glycerin catalyzed with potassium hydroxide. All feeds are added to a jacketed, baffled 9L stainless steel autoclave reactor equipped with a magnetically driven impeller, pressure transducer, redundant reactor thermocouples, and jacket return line thermocouple. Prior to the feed of butylene oxide, or any other additional oxides, the reactor is pressurized with nitrogen and vented several times to remove atmospheric oxygen, as would be understood by a person of ordinary skill in the art.

Firstly, glycerin (approximately 552 grams) and a 45 wt % aqueous potassium hydroxide solution (approximately 20 grams) are charged to a round bottom flask, dehydrated on a rotary evaporator at 100° C. with vacuum (100-150 mm Hg) for 1 hour, and measured for water by Karl Fisher titration (measured as 0.01% water). Then, the resultant catalyzed glycerin initiator (approximately 531 grams) is transferred to the reactor, and the contents are heated with agitation at 135° C. Next, the butylene oxide (approximately 5275 grams) is metered into the reactor over a period of 20 hours at 135° C.

After the butylene oxide feed is complete, the reactor contents are agitated at 140° C. for 6 hours to consume unreacted oxide (digest). Then, the reactor is cooled to 60° C. and the contents are drained (approximately 5814 grams), resulting in an intermediate. As would be understood by a person of ordinary skill in the art, in view of the use of potassium hydroxide as the catalyst, a portion of the intermediate is neutralized with magsil (magnesium silicate). The resultant neutralized intermediate has a viscosity of 352 cSt at 25° C., a hydroxyl number of 163 mg KOH/g (corresponding to a hydroxyl equivalent weight of 343 g/mol equivalence and a number average molecular weight of 1029 grams/mol), and a controlled polymerization rate of 0.5. The controlled polymerization rate value defines quantitatively the weakly basic materials present in a polyol. These materials are not defined qualitatively but are determined as the total weak acid salts of the strong bases. These salts may act as catalysts for the reaction of polyols with isocyanates. The reported number is ten times the number of milliliters of 0.01 N HCl necessary to neutralize 30 grams of the polyol sample.

Secondly, an un-neutralized portion of the intermediate (approximately 1294 grams) is re-catalyzed with the 45% aqueous potassium hydroxide solution (approximately 40 grams) and charged to a round bottom flask, dehydrated on a rotary evaporator at 100° C. and 100-150 mm Hg for 1 hour, and measured for water by Karl Fisher titration (measured as 0.07%). Then, the resultant re-catalyzed, dehydrated intermediate (approximately 1287 grams) is charged to the reactor and the contents are heated with agitation at 135° C. Additional butylene oxide (approximately 4470 grams) is metered into the reactor over a period of 13 hours at 135° C.

After the butylene oxide feed is complete, the reactor contents are agitated at 140° C. for 2 hours to consume unreacted oxide (digest). Then, the reactor is cooled to 60° C. and the portion of the contents are drained (approximately 2173 grams), resulting in a second intermediate. A portion of the second intermediate is neutralized with magsil. The resultant neutralized second intermediate has a viscosity of 952 cSt at 25° C. and a hydroxyl number of 46.2 mg KOH/g (corresponding to a hydroxyl equivalent weight of 1214 g/mol equivalence and a number average molecular weight of 3642 g/mol).

Thirdly, the remaining un-neutralized reactor contents of the second intermediate, calculated to be approximately 3583 grams, are heated with agitation at 135° C. Then, additional butylene oxide (approximately 1440 grams) is metered into the reactor over a period of 3 hours at 135° C.

After the butylene oxide feed is complete, the reactor contents are agitated at 140° C. for 12 hours to consume unreacted oxide (digest). Then, the reactor is cooled to 60° C., and the portion of the contents are drained (approximately 2173 grams), resulting in a third intermediate. A portion of the third intermediate (approximately 196 grams) is neutralized with magsil. The resultant neutralized third intermediate has a viscosity of 1339 cSt at 25° C. and a hydroxyl number of 35.8 mg KOH/g (corresponding to a hydroxyl equivalent weight of 1567 g/mol equivalence and a number average molecular weight of 4701 g/mol).

Fourthly, the remaining reactor content of the third intermediate is neutralized with magsil, to form the resultant High MW BO Polyol (approximately 4514) grams. The resultant MW BO Polyol has a CPR of 2.3. The High MW BO Polyol, similar to the third intermediate, is believed to have a viscosity of 1339 cSt at 25° C. and a hydroxyl number of 35.8 mg KOH/g.

Preparation of Cured Compositions

The materials principally used in the examples are as follows:

| | |
|---|---|
| Low MW BO Polyol 1 | A butylene oxide based polyether polyol derived from at least a majority of butylene oxide, having a nominal hydroxyl functionality of 2, a hydroxyl number of approximately 56 mg KOH/g, a number average molecular weight of approximately 2000 g/mol, and derived from a majority of butylene oxide based on the total amount of alkylene oxides used to form the polyol (available as VORAPEL ™ D3201 from The Dow Chemical Company). |
| Low MW BO Polyol 2 | A butylene oxide based polyether polyol derived from at least a majority of butylene oxide, having a nominal hydroxyl functionality of 3, a hydroxyl number of approximately 275 to 295 mg KOH/g, and a number average molecular weight of approximately 600 g/mol (available as VORAPEL ™ T5001 from The Dow Chemical Company). |
| Low MW PO Polyol | A propylene oxide based polyether polyol, having a nominal hydroxyl functionality of 2, a hydroxyl number of approximately 56 mg KOH/g, and a number average molecular weight of approximately 2000 g/mol (available as VORANOL ™ 220-056 from The Dow Chemical Company). |
| High MW PO Polyol | A propylene oxide based polyether polyol, having a nominal hydroxyl functionality of 3, a hydroxyl number of approximately 34 mg KOH/g, and a number average molecular weight of approximately 4900 g/mol (available as VORANOL ™ 232-034 from The Dow Chemical Company). |
| Isocyanate | A modified MDI that is a polycarbodiimide-modified diphenylmethane diisocyanate (available from The Dow Chemical Company as ISONATE ™ 143L). |
| Prepolymer A | A prepolymer prepared by mixing 33.2 parts of the BO Polyol 1 and 66.8 parts of the Isocyanate, and then heating the mixture in a glass jar at 80° C. for a period that allows for a residual free isocyanate content (determined by titration) of near 18 wt %. |
| Prepolymer B | A prepolymer prepared by mixing 33.2 parts of the Low MW PO Polyol and 66.8 parts of the Isocyanate, and then heating the mixture in a glass jar at 80° C. for a period that allows for a residual free isocyanate content (determined by titration) of near 18 wt %. |
| Chain Extender | A solution of dipropylene glycol based chain extender (available from Sigma-Aldrich ®). |
| Additive 1 | A moisture scavenger (available as VORATRON ™ EG 711 from The Dow Chemical Company). |
| Additive 2 | An organotin catalyst (available as DABCO ® T-131 from Air Products). |

Referring to Table 1, below, Working Example 1 is prepared using the High MW BO Polyol and the BO polyol based Prepolymer A. Comparative Example A is prepared using the High MW PO Polyol and the PO polyol based Prepolymer B. Comparative Examples B and C are prepared using a combination of the Low MW BO Polyol 1 and the Low MW BO Polyol 2 and the BO Polyol based Prepolymer A and the Isocyanate, respectively. Each example is prepared by pre-blending the polyols and additives in a Flacktek speed mixing cup for 40 seconds at 2100 rpm. The prepolymer or isocyanate is added to the pre-blended mixture at a volumetric mix ratio of approximately 1:1, and the resultant mixture is mixed for 40 seconds at 2100 rpm. Then, the mixture is poured into a flat circular mold, which has been left open to the atmosphere, to form a plaque. The plaque is allowed to cure for approximately four hours at room temperature, followed by a two-hour post-cure at 80° C.

TABLE 1

| | Ex 1 | Comp. Ex. A | Comp. Ex. B | Comp. Ex. C |
|---|---|---|---|---|
| Components (wt %) | | | | |
| High MW BO Polyol | 30.6 | — | — | — |
| High MW PO Polyol | — | 37.8 | — | — |
| Low MW BO Polyol 1 | — | — | 29.5 | 43.1 |
| Low MW BO Polyol 2 | — | — | 2.7 | 5.7 |
| Prepolymer A | 54.3 | — | 54.4 | — |
| Prepolymer B | — | 54.4 | — | — |
| Isocyanate | — | — | — | 37.4 |
| Propylene Glycol | 13.2 | — | 11.7 | 11.4 |
| Ethylene Glycol | — | 6.0 | — | — |
| Additive 1 | 1.8 | 1.8 | 1.7 | 2.4 |
| Additive 2 | 0.1 | <0.1 | <0.1 | <0.1 |
| Properties | | | | |
| Tensile Strength (psi) | 2427 | 1737 | 1744 | 2404 |
| Elongation at Break (%) | 236 | 349 | 311 | 290 |
| Soft Segment Tg (° C.) | −24 | −27 | 15 | 2 |
| Hard Segment Tg (° C.) | 94 | >150 | 104 | 100 |

Figure 1:
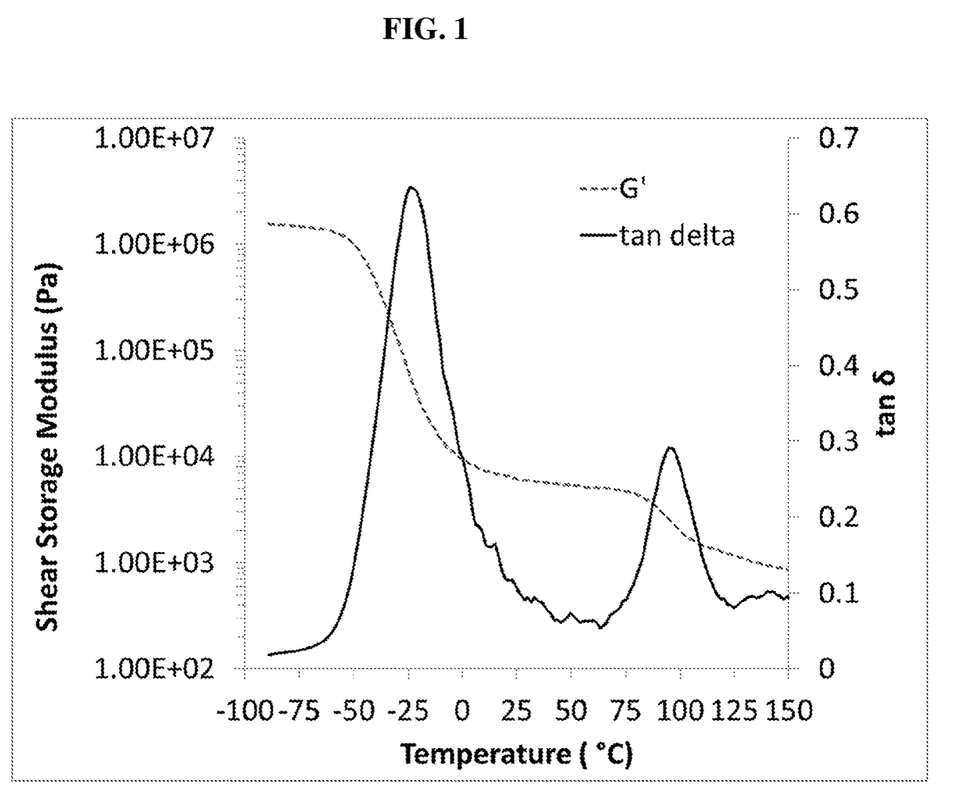
FIG. 1 illustrates a dynamic mechanical thermal analysis, showing shear storage modulus and tan delta as a function of temperature, for Example 1.
Figure 2:
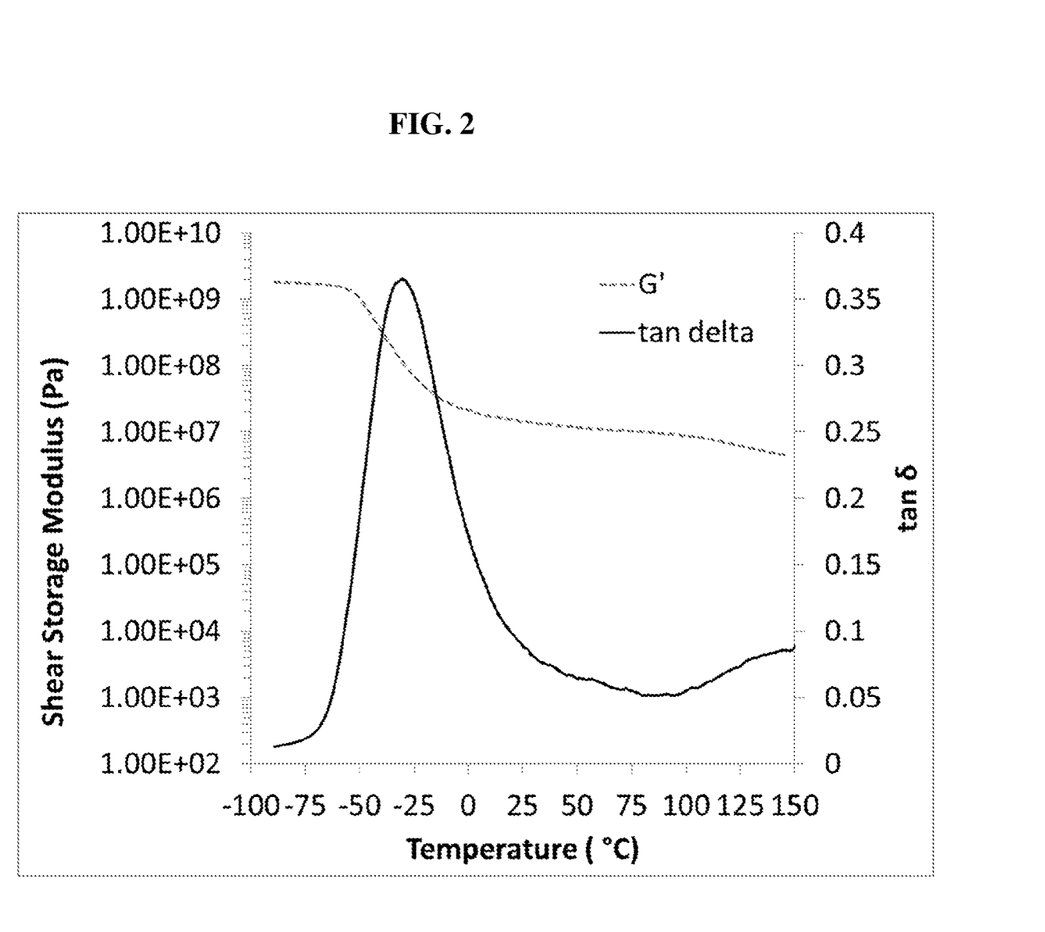
FIG. 2 illustrates a dynamic mechanical thermal analysis, showing shear storage modulus and tan delta as a function of temperature, for Comparative Example A.
Figure 3:
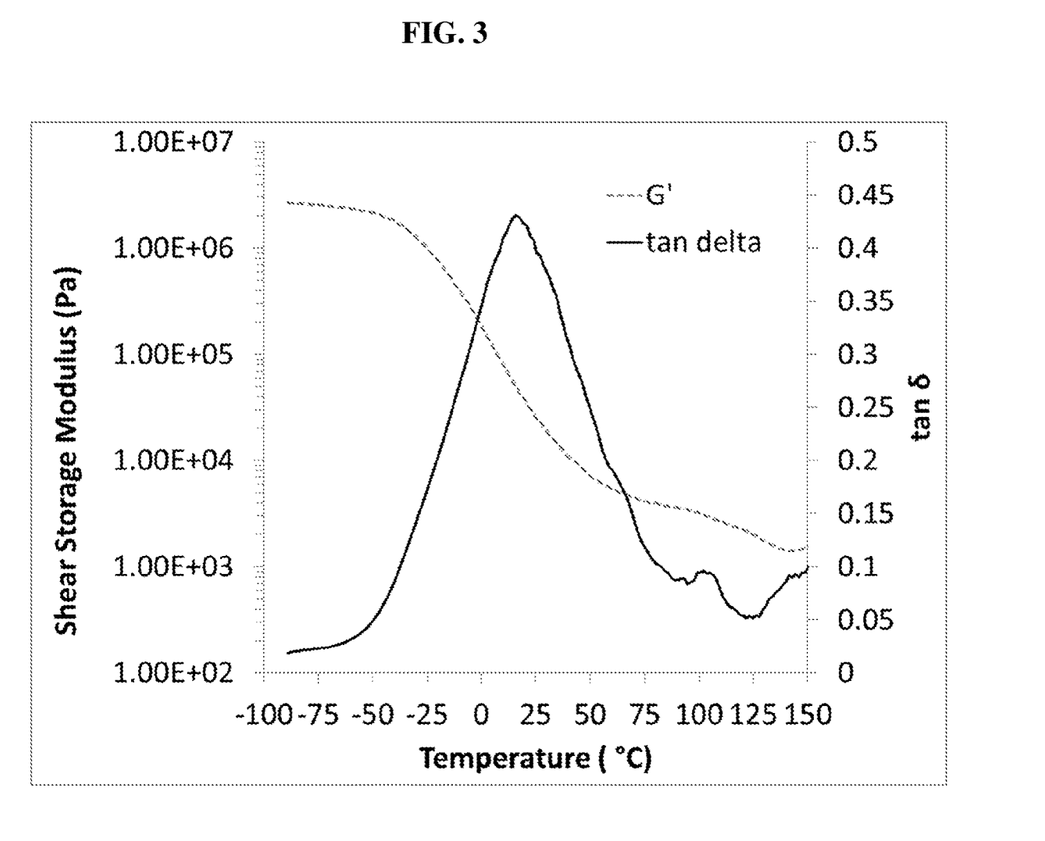
FIG. 3 illustrates a dynamic mechanical thermal analysis, showing shear storage modulus and tan delta as a function of temperature, for Comparative Example B.
Figure 4:
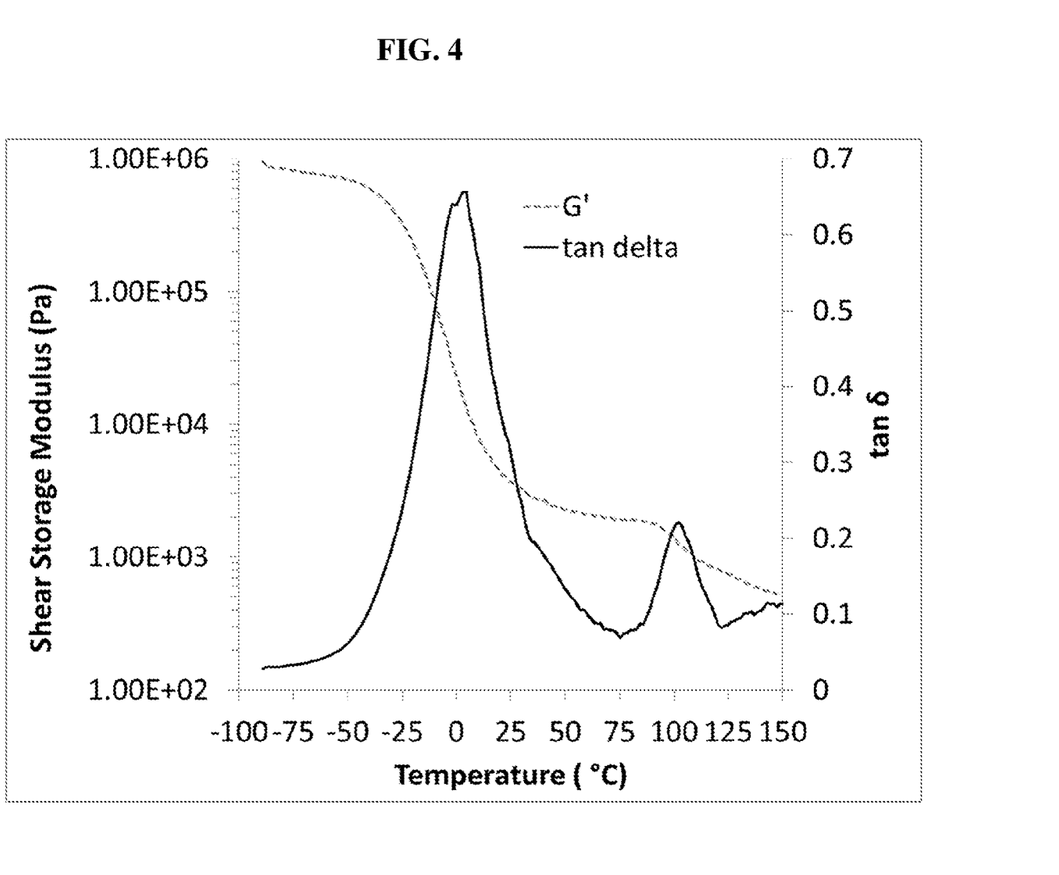
FIG. 4 illustrates a dynamic mechanical thermal analysis, showing shear storage modulus and tan delta as a function of temperature, for Comparative Example C.

Tensile strength, elongation at break, and Young's modulus are determined according to ASTM D1708. The glass transition temperature was determined using dynamic mechanical analysis and is assigned as the temperature at which the tan delta peak reaches a maximum. The DMTA results for Working Example 1 is shown in FIG. 1. The DMTA results for Comparative Examples A to C are shown in FIGS. 2 to 4, respectively. For DMTA, sample bars of dimension 47.5 mm×7 mm were cut from cured plaques using a die press and analyzed using a TA Instruments ARES II rheometer in the torsion mode. The viscoelastic response was measured at a fixed oscillatory frequency (1 Hz). Samples were first cooled to −90° C. and heated to 150° C. at a steady temperature ramp of 3° C./min. Glass transition temperatures were identified as the temperature at which the tan delta plot reached a maximum value.

Referring to Working Example 1 and FIG. 1, it is demonstrated that a cured composition with two glass transition temperatures and elastomeric mechanical properties can be produced by using the High MW BO Polyol. Further, the nominal volumetric mix ratio of the two-part formulation is 1:1, which may be considered an ideal mix ratio for two-component polyurethane based adhesive systems.

Also, the peaks observed in DMTA results are not particularly broad, having a FWHM (full-width, half maximum) value of 37° C. for the peak corresponding to the soft segment and 27° C. for the peak corresponding to the hard segment. In simplest terms, FWHM can be understood as the width of the tan delta peak (measured in degrees Celsius) measured at one-half of the maximum value of tan delta. In a Cartesian coordinate system, the maximum value of tan delta can be described as a single point defined by an abscissa (x) and an ordinate (y) in an ordered pair (x, y). The maximum value of tan delta is (y), while one-half of the maximum value can be expressed as (y/2). A horizontal line centered at (x, y/2) will intersect the tan delta peak at two points, ($x_1$, y/2) and ($x_2$, y/2). FWHM can be understood as the absolute value of the difference between $x_1$ and $x_2$, or [$x_2-x_1$]. It is believed that the most pronounced fluctuation in mechanical performance of polyurethane adhesive compositions occurs over the temperature range defined above as FWHM. Thus, minimizing the FWHM of the tan delta peak could provide more consistent mechanical performance. According to exemplary embodiments, the cured composition may have a FWHM peak from 5° C. to 50° C. (e.g., from 5° C. to 40° C., from 15° C. to 40° C., 25° C. to 40° C., etc.) for both the first peak and the second peak.

Referring to Comparative Example A and FIG. 2, a single glass transition temperature peak around −27° C. is realized. This single glass transition temperature, especially at such a low temperature, is disfavored as least because of the brittle nature of the formulation at room temperature.

Referring to Comparative Example B and FIG. 3, two glass transition temperature peaks are observed. However, the first peak is centered at a significantly higher temperature of 15° C., which results in a relatively soft formulation at low temperatures (i.e., temperatures equal to or below 0° C.), and results in poor low temperature performance. Further, the first peak has a high FWHM value of 71° C. The second peak is centered at 104° C., as such there is a very narrow range near 80° C., where the formulation realized two phases. Further, the FWHM value of the second peak is not calculable using the simple method described earlier due to the considerable overlap with the peak centered at 15° C. Accordingly, for Comparative Example B, the favorable 1:1 volumetric mix ratio is achieved at the expense of good phase separation, e.g., as evidenced by the lack of two well-defined peaks that are spaced apart in the DMTA results shown in FIG. 3.

Referring to Comparative Example C and FIG. 4, two glass transition temperatures peaks are observed. However, the first peak is centered at a significantly higher temperature of 2° C., which results in a relatively soft formulation at low temperatures (i.e., temperatures below 0° C.), and results in poor low temperature performance. The second peak is centered around 100° C. Further, while the first peak exhibits a FWHM value of 42° C. and the second exhibits a FWHM value of 27° C., the first peak is at the significantly higher temperature. Additionally, Comparative Example C, has an approximate volumetric mix ratio of 2:1, which is less favorable than the 1:1 mixing ratio provided by Working Example 1. It is noted that Comparative Example C is prepared using a "one-shot" approach in which a blend of two different low molecular weight BO Polyols are combined with a chain extender and reacted directly with a diisocyanate. Additionally, Comparative Example C has a volumetric mix ratio of 2:1, which is less favorable than the 1:1 mixing ratio provided by Working Example 1.

Working Example 1 and Comparative Example A are further evaluated for performance based on exposure to water. In particular, specimens of both Working Example 1 and Comparative Example A are immersed in water at 25° C., over various time intervals, and the change in tensile strength, percent elongation at break, and mass are measured as shown below in Table 2. Tensile strength and elongation at break for each specimen is determined according to ASTM D1708. The percent mass change is calculated as the absolute value of the difference between the initial mass and the mass after immersion in water divided by the initial mass.

TABLE 2

|  | Ex. 1 | Comp. Ex. A |
|---|---|---|
| Tensile Strength Properties | | |
| Initial tensile strength (psi) | 2427 | 1737 |
| Tensile strength after wet aging (21 days aging) | 1991 | 1533 |
| Tensile strength after wet aging (35 days aging) | 2051 | 1565 |
| Tensile strength after wet aging (49 days aging) | 2054 | 1545 |
| Percent Elongation at Break | | |
| Initial % Elongation at break (%) | 236 | 349 |
| % Elongation at break after wet aging (21 days aging) | 234 | 283 |
| % Elongation at break after wet aging (35 days aging) | 233 | 291 |
| % Elongation at break after wet aging (49 days aging) | 226 | 286 |
| Percent Mass Change | | |
| Percent Mass change after wet aging (21 days aging) | 0.5 | 1.5 |
| Percent Mass change after wet aging (35 days aging) | 0.8 | 1.9 |
| Percent Mass change after wet aging (49 days aging) | 0.8 | 1.9 |

Referring to Table 2, Working Example 1 realizes a higher initial tensile strength and tensile strength after wet aging. Further, while Working Example 1 did not experience significant changes in percent elongation at break, Comparative Example A did experience such changes. Further, the percent mass change for Working Example 1 is lower than the percent mass change for Comparative Example A. Without intending to be bound by this theory, the difference may be attributed to the greater hydrophobicity of the butylene oxide derived polyol used in Working Example 1. In addition, the ability to resist water penetration and swelling could be an important feature in adhesive applications, e.g., in applications where the adhesive is intended to simultaneously bond adherends as well as provide a seal or barrier to wet conditions that might damage the adherends or other critical components.

Preparation of Adhesive Compositions

The additional materials principally used in the adhesive composition examples are as follows:

| Additive 3 | A filler of calcium carbonate (available as Microcarb ST-10H from Minelco). |
|---|---|
| Additive 4 | A solution of 3-glycidoxypropyl trimethoxysilane, an adhesion promoter (available from Sigma-Aldrich ®). |

The adhesive compositions of Working Example 2 and Comparative Example D are prepared using the same methods used to prepare Working Example 1 and Comparative Example A, respectively, with the exception that Additives 3 and 4 are additionally incorporated into the resultant composition.

TABLE 3

|  | Ex. 2 | Comp. Ex. D |
|---|---|---|
| Components (wt %) | | |
| High MW BO Polyol | 21.0 | — |
| High MW PO Polyol | — | 25.9 |
| Prepolymer A | 37.3 | — |
| Prepolymer B | — | 37.3 |

TABLE 3-continued

|  | Ex. 2 | Comp. Ex. D |
| --- | --- | --- |
| Propylene Glycol | 9.1 | — |
| Ethylene Glycol | — | 4.2 |
| Additive 1 | 1.2 | 1.2 |
| Additive 2 | <0.1 | <0.1 |
| Additive 3 | 30.0 | 30.0 |
| Additive 4 | 1.4 | 1.4 |
| Properties | | |
| Tensile Strength (psi) | 1534 | 1775 |
| Percent Elongation at Break (%) | 236 | 254 |
| Lap Shear Adhesion to Steel (psi) (measured as cohesive failure) | 1120 | 1037 |
| Lap Shear Adhesion to Aluminum (psi) (measured as cohesive failure) | 1116 | 852 |

Referring to Table 3, lap shear testing is performed using two different substrates, viz., a cold-rolled steel based substrate and an aluminum based substrate. Lap shear testing is measured according to ASTM D-1002. Aluminum and cold-rolled steel adherends are obtained from ACT Test Panels and are wiped with 2-butanone prior to application of respective adhesives. Without intending to be bound by this theory, Working Example 2 provides greater hydrophobicity, while still comparable adhesion properties.

As would be understood by a person of ordinary skill in the art, the above compositions may be used for forming adhesives or coatings, whereas the composition is used as an adhesive when placed between two layers/substrates, and the composition is used as a coating when placed on an outer layer/substrate.

The invention claimed is:

1. A cured composition, comprising:
a reaction product of a mixture that includes an isocyanate component having one or more isocyanates and an isocyanate-reactive component having a butylene oxide based polyol, which has a number average molecular weight greater than 2,000 g/mol and less than 8,000 g/mol and a nominal hydroxyl functionality from 2 to 4, at least 50 wt % of a total weight of alkylene oxides used to form the butylene oxide based polyol being butylene oxide, and an isocyanate index of the mixture being from 90 to 150; and
the cured composition in a cured state exhibits a first tan delta peak between a first temperature range of −50° C. to 0° C. and a second tan delta peak between a second temperature range of 75° C. and 150° C., according to a tan delta plot over a range of temperatures, and a value of the first tan delta peak and a value of the second tan delta peak each represents a ratio of a loss modulus of the cured composition and a storage modulus of the cured composition at a specific temperature within the range of temperatures, as measured according to dynamic mechanical thermal analysis, the values of the first and the second tan delta peaks being from 0.10 to 0.90.

2. The composition as claimed in claim 1, wherein the butylene oxide based polyol is derived from 75 wt % to 100 wt % of butylene oxide, based on a total weight of alkylene oxides, the nominal hydroxyl functionality is 3, and the butylene oxide based polyol is present in an amount from 5 wt % to 100 wt % of a total weight of polyols in the isocyanate-reactive component.

3. The composition as claimed in claim 1, wherein the number average molecular weight of the butylene oxide based polyol is from 4000 g/mol to 5500 g/mol.

4. The composition as claimed in claim 1, wherein a volumetric ratio of the isocyanate component to the isocyanate-reactive component is from 0.8:1.2 to 1.2:0.8.

5. The composition as claimed in claim 1, wherein the isocyanate-reactive component further includes a polyether polyol different from the butylene oxide based polyol and having a nominal hydroxyl functionality of 2.

6. The composition as claimed in claim 1, wherein the isocyanate component includes from 20 wt % to 100 wt %, based on the total weight of the isocyanate component, of one or more isocyanate terminated prepolymers having an isocyanate group content from 1 wt % to 35 wt %, based on the total weight of the one or more isocyanate terminated prepolymers.

7. The composition as claimed in claim 1, wherein the butylene oxide based polyol is prepared using from one to ten separate stages, each stage including the addition of butylene oxide.

8. The composition as claimed in claim 1, wherein the isocyanate-reactive component includes from 2 wt % to 25 wt % of dipropylene glycol, based on the total weight of the isocyanate-reactive component.

9. A polyurethane based adhesive, comprising the cured composition as claimed in claim 1.

10. A polyurethane based coating, comprising the cured composition as claimed in claim 1.

* * * * *